UNITED STATES PATENT OFFICE.

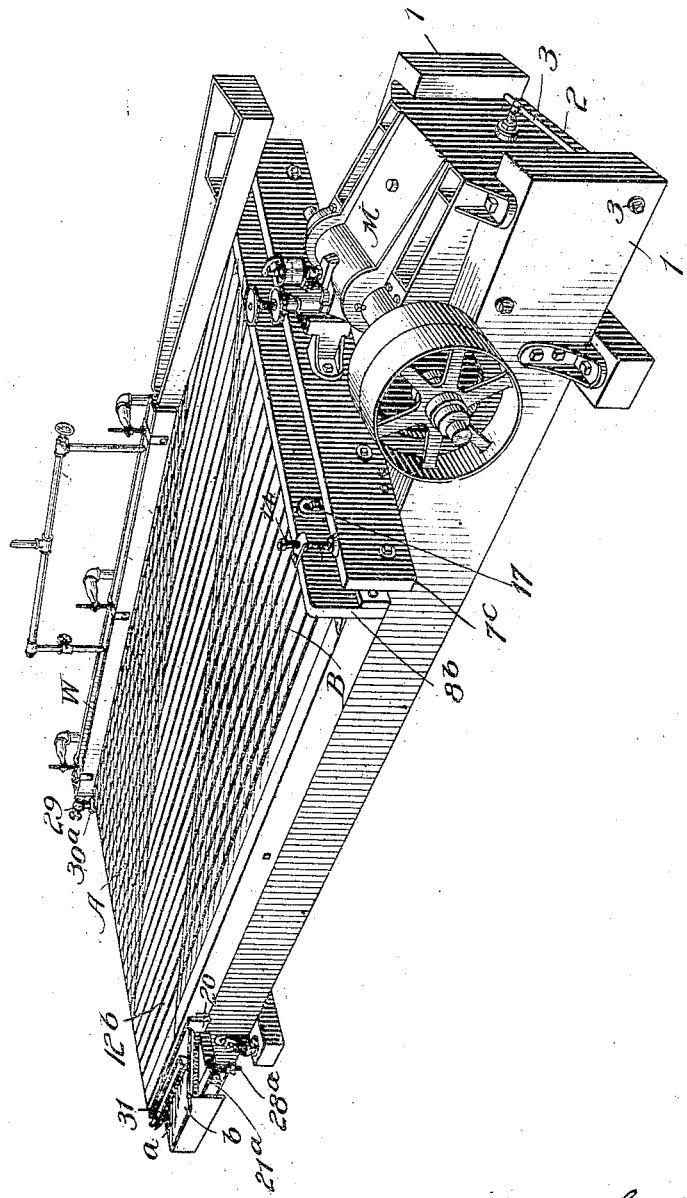

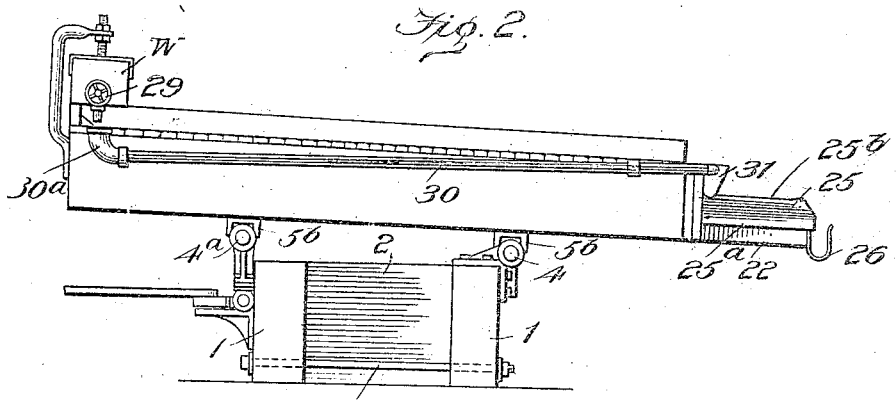
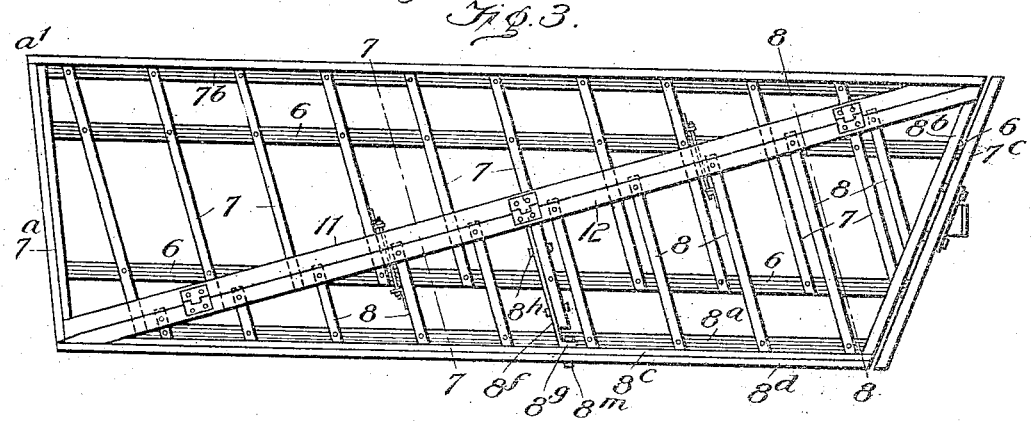
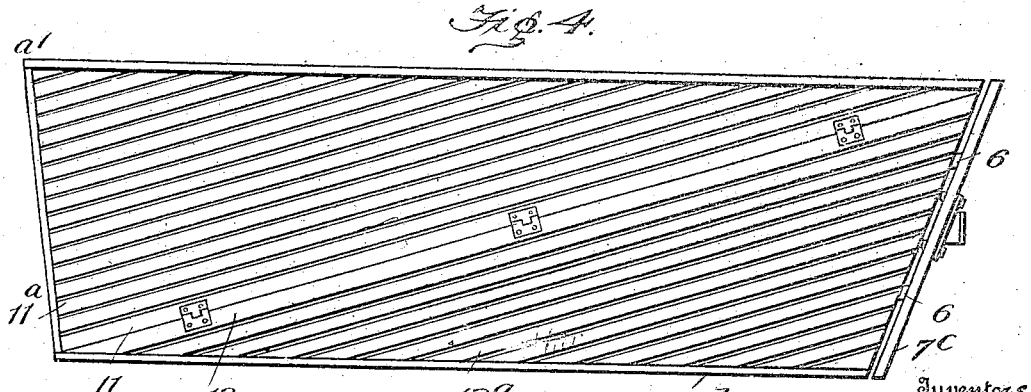

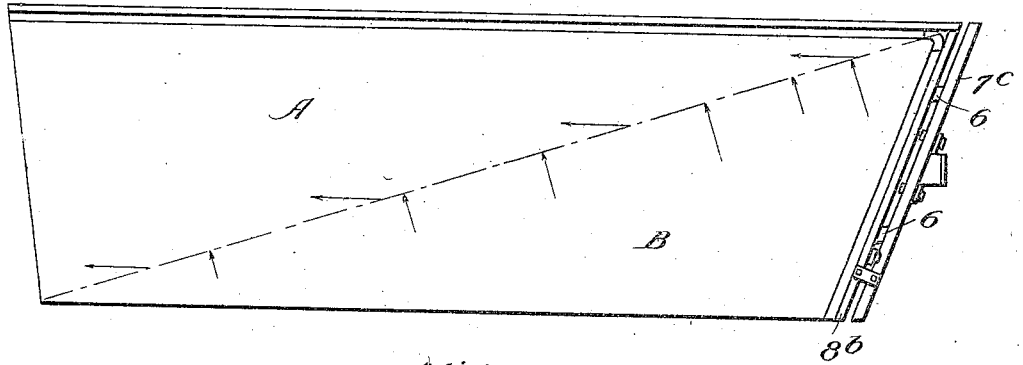
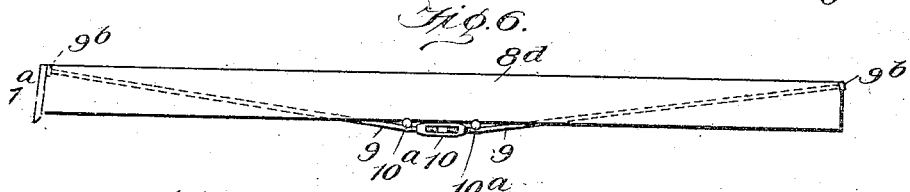
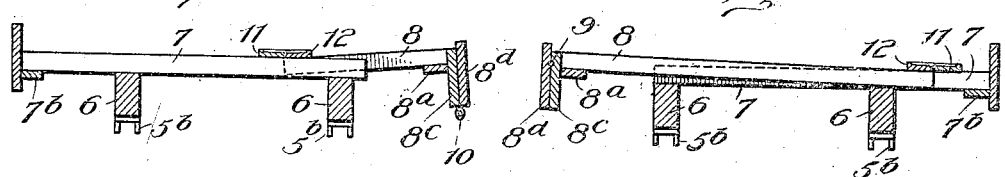
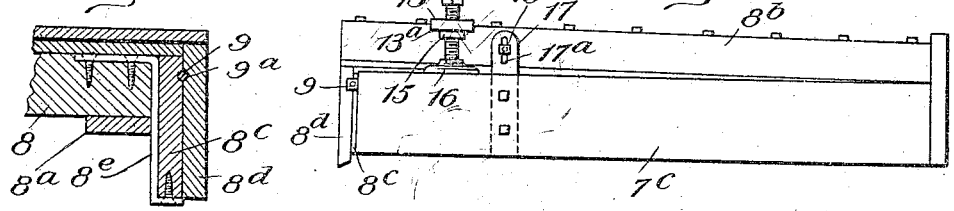
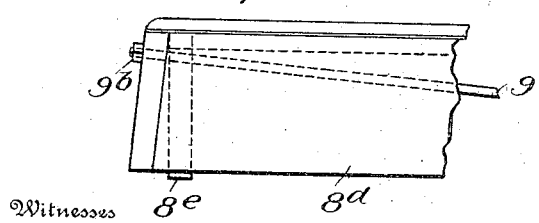
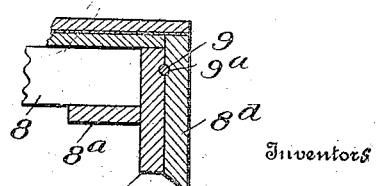

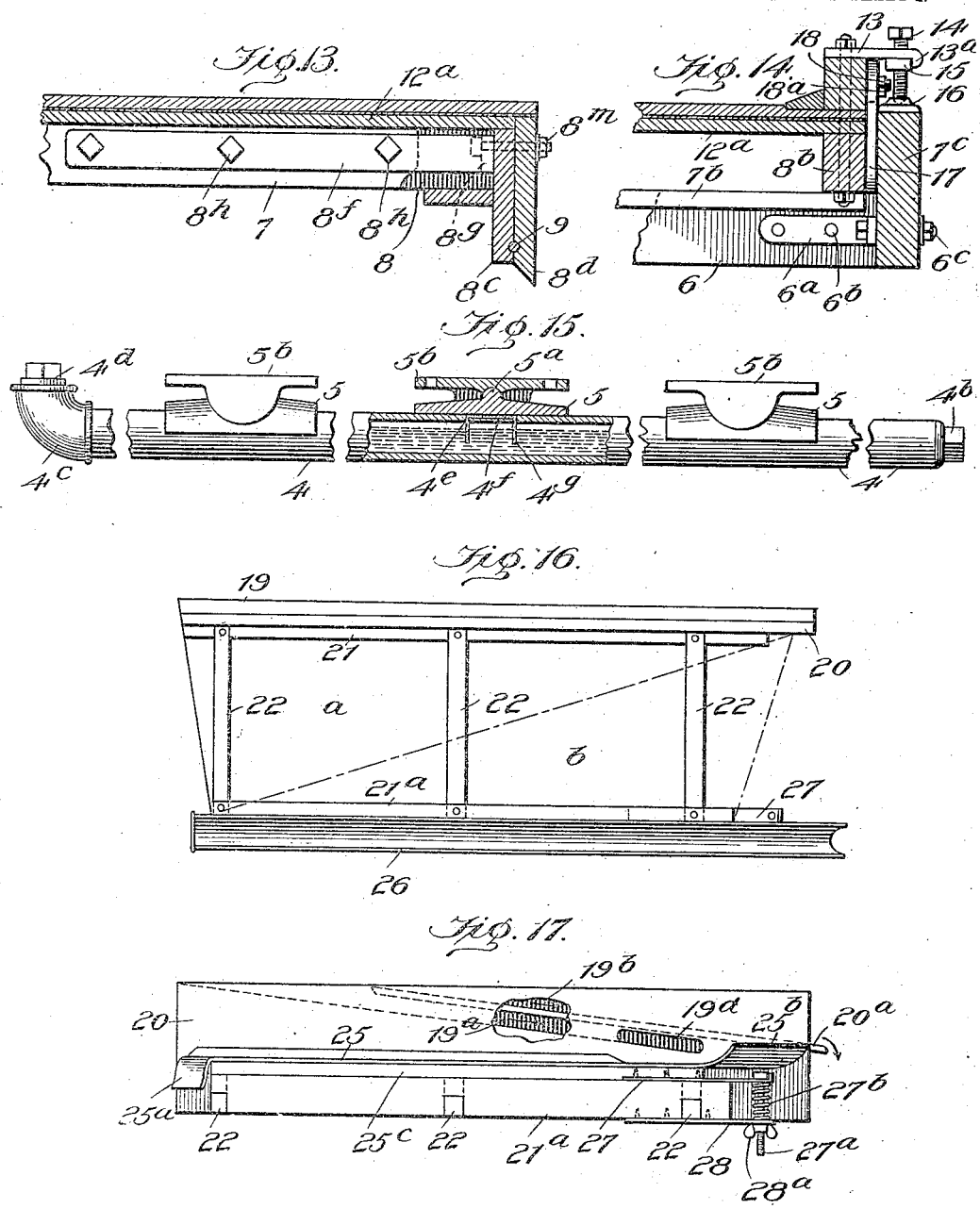

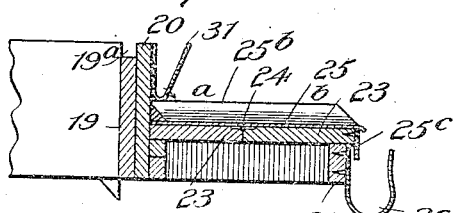
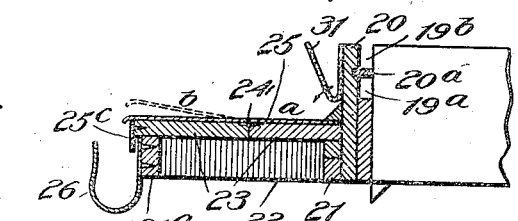
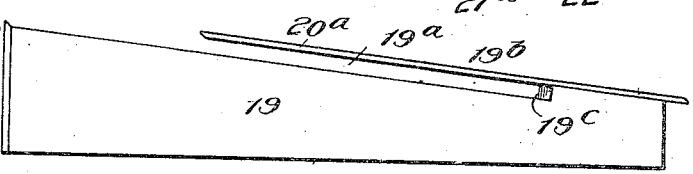
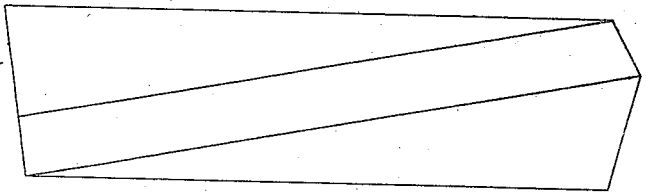
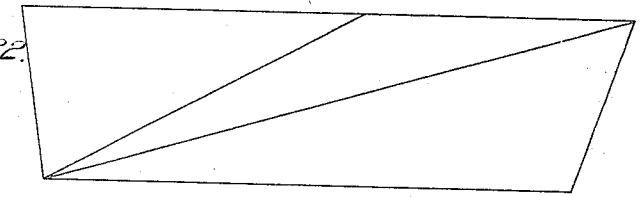
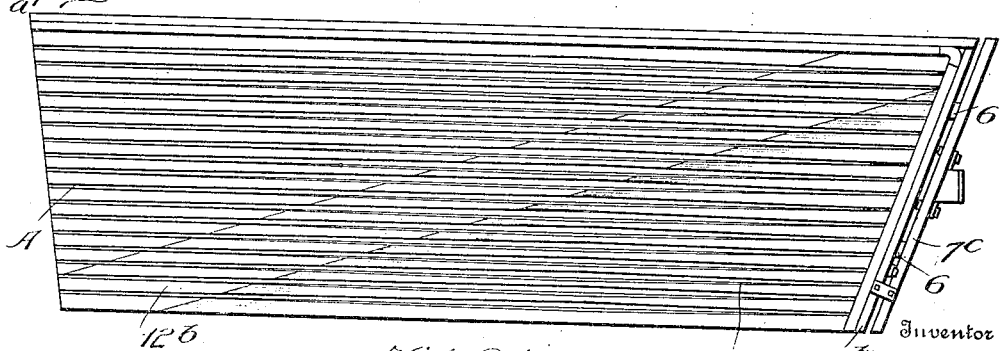

WILLIAM L. CARD AND FRANK S. CARD, OF DENVER, COLORADO, ASSIGNORS TO THE CARD MANUFACTURING COMPANY, OF DENVER, COLORADO, A CORPORATION OF COLORADO.

CONCENTRATOR.

1,094,640.

Specification of Letters Patent.

Patented Apr. 28, 1914.

Application filed May 26, 1905. Serial No. 262,417.

*To all whom it may concern:*

Be it known that we, WILLIAM L. CARD and FRANK S. CARD, citizens of the United States, residing at Denver, in the county of Denver and State of Colorado, have invented certain new and useful Improvements in Concentrators; and we do hereby declare the following to be a full, clear, and exact description of the invention, such as will enable others skilled in the art to which it appertains to make and use the same.

Our invention relates generally to the construction of multiplane decks for concentrators, whether the same be for main or auxiliary tables, singly or conjointly considered, and has for its objects, first, to retard and control the transverse flow of the pulp or material operated upon to insure proper stratification, and, second, to expedite the travel of metallic values longitudinally of the table whereby concentration is facilitated, and the capacity of the table increased with greater saving of values.

This invention pertains to that class of tables, commonly termed the Rittinger type, wherein the table is or may be adjustably inclined laterally, and is reciprocated longitudinally, the inclination in conjunction with the transverse flow of dressing water being for the purpose of separating the gangue from the metallic values and discharging the gangue at the lower or tailings side of the table, and the reciprocation of the table being for the purpose of assisting in the stratification of the metallic values, and for effecting the discharge of the values over the toe or front end of the table. As a rule tables of this type are in the form of a plane surface with slight lateral inclination and consequently of limited capacity, for the reason that such degree of inclination as would result in materially increasing the capacity of the table, would result, with a plane surface table, in an undue loss of values. To increase the inclination and resultant capacity of this class of tables without proportionate loss of values, the later tables of the Rittinger type have added thereto longitudinally disposed channels, produced either by strips or riffles applied to, or grooves or channels formed in, the deck or surface of the table. In the operation of this type of table whether plane, riffled, or grooved, the effect of the conjoint action of the longitudinal vibration of the table and the transverse flow of dressing water on the pulp or material operated upon is to induce stratification of the metallic particles and a curved downward movement of the heavier particles from the upper side and rear end of the table toward the lower side and front end of the table, the degree of inclination of the path of travel of the values being dependent on the weight, size and shape of the respective particles; the heavier metallic particles, having the greater momentum imparted to them by the reciprocation of the table, follow a path more nearly approaching the longitudinal axis of the table, while the lighter metallic particles take a course more or less downwardly curved and are discharged from the toe or front end of the table at different distances from the tailings side of the table, or at least such thereof as are not carried over the lower or tailings side of the table with the gangue by the dressing water.

Owing to the fact that the lighter metallic particles and the heavier coarser gangue particles of some shapes, as well as particles composed in part of gangue and in part of the metallic substance to be saved, are affected by the operation of the table in approximately the same manner, there is formed on the table a moving band of material of varying width which extends downward diagonally from the feed side of the table to the lower front end thereof and which is comprised of the lighter particles of the values some coarser particles of gangue and particles of attached gangue and metallic values, such material being termed the middlings and requiring further treatment or concentration.

Heretofore two methods of treating the middlings for the elimination of the gangue have been commonly resorted to, viz., the return of the middlings to the feed box of the same table, which soon results in overloading the table with middlings and reducing the efficiency and capacity thereof; or, the subsequent treatment of the middlings from a group of tables on an independent table, such latter process being only economically practised in large mills. A third and less common method of treating the middlings has been to feed them to an auxiliary table or device attached to and movable with the main table, but as in such cases the operating conditions on the auxiliary table, in respect to the inclination of the table and the character of the vibration, remain the same as those causing the formation of the middlings band on the main table, the results from such method have not been considered economical or satisfactory in separating the metallic particles from the mixed mass of middlings.

Experience with tables of the character above noted, that is to say, with tables wherein the deck is in effect a single plane, has shown that such lateral inclination of the table and such volume of dressing water as, combined, will bring clean metallics over the front, or concentrate end of the table, will at the same time cause the pulp, which is fed along the upper edge or feed side of the deck contiguous to the rear end of the table, to drift too far down toward the tailings discharge side of the table before a proper degree of stratification is effected, the result being that considerable portions of the metallics or values are not freed or separated from the gangue in sufficient time to permit them to pass off the end of the table and be recovered with the concentrates, but are carried over the tailings side of the table and are lost with the gangue. The same conditions exist and similar results are obtained in the use of auxiliary decks for the concentration of middlings as at present constructed and used in conjunction with the main table.

We have discovered as a result of careful and prolonged search and experiment, that if there be combined with a concentrator table of the Rittinger type, whether plane, riffled, or channeled, or whether main or auxiliary, means for retarding and controlling the transverse movement of the material operated upon at the feed end and tailings side of the table, and for facilitating the longitudinal travel of the metallics away from the feed end of the table, the capacity of the device will be proportionately increased and the loss of values greatly diminished, and the combination of such means in or with a concentrator table, either main or auxiliary, embodies the principal feature of our invention.

In carrying out our invention we preferably construct the table or deck of a plurality of planes or surfaces of constant area, said planes being inclined with respect to each other, and one or more of said surfaces being inclined downwardly from the rear or feet end toward the front end and having a decreased transverse inclination toward the tailings discharge side of the table, whereby the side flow of the pulp toward the tailings discharge side of the table is retarded and a component of forward flow toward the concentrates discharge end of the table is established, thus affording a longer time and, consequently, a greater opportunity for the stratification or separation of the metallics from the gangue to take place before the tailings discharge side of the table is reached and at the same time assisting the longitudinal impulses of the table to quickly carry the valuable metallic particles which have settled upon the table surface forwardly toward the concentrates discharge end of the table, thus diminishing their liability of passing into the tailings, and such a construction embodies a further feature of our invention. In order to adapt the gradient of such of said planes or surfaces of the deck or table as are inclined forwardly downward toward the front end of the table to the varying character of the pulp or other material to be operated upon and to the varying volume of dressing water required therefor, we preferably render said planes adjustable, or, in other words, we preferably construct the multiplane deck with its planes relatively adjustable, and such a construction embodies a further feature of our invention.

There are other, minor, features of invention embodied in certain combinations and elemental constructions, all as will hereinafter more fully appear.

In the drawings accompanying this specification and forming part of the same, Figure 1 is a perspective view of a main and an auxiliary table embodying our invention. Fig. 2 is a view in elevation of the front or concentrate discharge end of the main and auxiliary tables shown in Fig. 1. Fig. 3 is a plan view of the deck-frame of the main table. Fig. 4 is a plan view showing the sub-deck applied to the deck-frame. Fig. 5 is a plan view of the sub-deck as it appears when a covering or working face of rubber, linoleum or similar suitable material is superposed thereon, the diagonal line indicating the line of flexure. The appearance of the deck when a channeled or riffled working surface of wood or other suitable material is used is shown in the plan views, Figs. 1 and 23. Fig. 6 is an elevation of the tailings side of the deck or table showing the manner of trussing the same, the auxiliary deck being omitted. Fig. 7 is a transverse section of the deck frame on the line 7—7, Fig. 3, looking toward the rear end of the table. Fig. 8 is a section of the deck frame on the line 8—8, Fig. 3, looking in the reverse direction or toward the front end of the table. Fig. 9 is a detail sectional view of a portion of the table showing the manner of supporting the trussed side of the deck at its obtuse angled forward end. Fig. 10 is an elevation of the rear end of the main deck or table, showing the means for adjusting the inclination of one of the planes thereof. Fig. 11 is an enlarged detail view of a portion of the tailings side of the main-deck or table. Figs. 12 and 13 are enlarged detail sectional views illustrating the manner of trussing the tailings-side of the main table or deck and bracing it against vibration when adjusted. Fig. 14 is a sectional detail view showing the means for adjusting the independently adjustable section of the main table or deck. Fig. 15 is a view of the tubular track rod and slide bearings of the table, illustrating the method of supplying the lubricant to the said slide-bearings. Fig. 16 is a plan view of the deck-frame of the auxiliary deck. Fig. 17 is side elevation of the auxiliary deck or table looking from the tailings side and showing its connection with the main table or deck. Fig. 18 is a vertical transverse section of the auxiliary deck or table, and a portion of the main deck or table, looking from the front or concentrate discharge end. Fig. 19 is a vertical transverse section of the auxiliary deck or table and a portion of the main deck or table looking from the rear end of the table. Fig. 20 is an enlarged detail view of a portion of the middlings channel leading from the main to the auxiliary deck or table, and also of a portion of the longitudinally adjustable floor or partition board which divides the same from the upper or waste channel. Figs. 21 and 22 are diagrams of other forms of multiplane decks. Fig. 23 is a detached plan view of the channeled table shown in perspective in Fig. 1, and Fig. 24 is a transverse section of a portion of the main table shown in Fig. 23, illustrating the arrangement of riffles on the line of flexure of the table superimposed upon a linoleum top, as well as additions to the lands along the same line in a channeled top in order to increase the depth of the channels along the line of flexure of the table.

Like symbols refer to like parts wherever they occur.

We will now proceed to describe the preferred form of our invention more fully so that others skilled in the art to which it appertains may apply our invention either in the form illustrated in the drawings or in such modification thereof as circumstances may dictate.

In conjunction with the concentrator decks hereinafter described there will be employed a suitable foundation for the table, mechanism for adjusting the lateral inclination of the deck-frame or table as a whole, and mechanism for imparting a reciprocating movement to the deck-frame, or table as a whole, all of which may be of any approved form, the mechanism for adjusting the lateral inclination of the deck, however, preferably being such as is shown and described in our Patent #758,413, dated April 26, 1904, and the mechanism or head motion for imparting the reciprocating movement to the table being preferably either of the character shown and described in our Patent #777,838, dated December 20, 1904, or as shown and described in our application Serial Number 262,418, filed of even date herewith (Patent Number 907,736, issued December 29, 1908).

Referring to the drawings, 1, 1 indicate the longitudinal timbers of a suitable foundation frame which may be cross-braced by distance blocks 2 and bolted together by tie-rods or cross-rods 3, one of said timbers or sills 1, 1, carrying side brackets for the fixed track-rod 4 which is adjacent to the lower or tailings side of the table and the other of said timbers being provided with vertically adjustable shoes for the adjustable track-rod 4ª adjacent to the upper or feed side of the table.

On the under side of the deck-frame or table at proper intervals are secured suitable slide bearings 5 by means of which the deck or table is slidably supported on said track-rods so as to be reciprocated longitudinally by suitable mechanism.

In our present construction the track-rods 4, 4ª are of tubular form (see Fig. 15), closed at one end by threaded plugs 4ᵇ, and provided at the other with elbows 4ᶜ and a removable stopper 4ᵈ, the track rods thus constituting reservoirs for lubricants. The upper or tread surfaces of the track rods are perforated at intervals, as at 4ᵉ, said perforations being connected by a groove or channel 4ᶠ, and a feeder of felt 4ᵍ, or other suitable capillary material, being inserted in said perforations and grooves in order to automatically and continuously supply the slide bearings 5 of the table with the lubricants. The slide bearing 5 may be provided upon its upper surface with the projection 5ª which is adapted to be received in a concave depression in the under side of the member 5ᵇ, an equalizing slide bearing being thus obtained.

M indicates the mechanism for actuating the table or deck, the complement of such head motion mechanism being preferably a reaction spring carried on, or secured to, the under side of the table and adjustably anchored to the sub-frame 1 (as illustrated in our Patent #758,413, hereinbefore referred to), but any other well known means for like purpose may be employed.

The deck-frame is comprised of a plurality of sections divided on a line or lines extending obliquely downward and forward from the feed side of the deck toward the concentrates discharge end thereof, said sections being relatively adjustable and adapted to support the plurality of planes constituting the working face or concentrating surface of the table. In constructing such a deck-frame for the main table, we preferably secure to the stringers 6, 6 to the under side of which are attached the slide bearings 5, 5, a series of joists 7, 7, and arrange the same at an angle to the feed side of the table, preferably at right angles to the oblique junction line of the sections comprising the table. This section of the deck-frame may then be rendered rigid by the side and end strips $7^a$, $7^b$, $7^c$. The complemental section of the deck frame, which rests adjustably upon and is carried by this primary reciprocating section, as formed by arranging at right angles to the line of division of the sections, or at an angle to the tailings side of the table, a corresponding series of joists 8, 8 which gradually decrease in length from the rear end of the table toward the front or concentrate end thereof, said joists, however, being preferably staggered with respect to the joists 7, 7 (see Fig. 3) and overlapping the same. This section of the deck frame is rendered rigid and is bound by the side and end strips $8^a$, $8^b$ and the tailings boards $8^c$, $8^d$ secured thereto.

In order to truss and strengthen the tailings side of the movable section of the deck frame, which, in the construction chosen for purposes of illustration, receives no direct bracing from the stringers 6, 6, the tailings boards $8^c$, $8^d$ are grooved diagonally as at $9^a$ (see Figs. 6, 11, and 12), and secured in position on the ends of joists 8, 8, the truss-rods 9 having the heads $9^b$ are inserted in said grooves $9^a$ and connected by the turnbuckle 10, and bearing pins or posts $10^a$ are inserted between the rods 9 and the tailings boards $8^c$, $8^d$ of the table. As a further means of bracing this independently movable section of the deck and supporting the trussed side therefrom in such manner as to allow sufficient pivotal movement to permit any required adjustment of the movable sections, a hanger $8^e$ (see Fig. 9) is employed, the upper end or arm of such hanger being bolted or otherwise secured to the top of a joist 8 wherein it is countersunk, and the lower end or arm thereof extending under and being secured to the tailings board $8^c$; there may be also provided a metal strap or straps $8^f$ (see Figs. 3 and 13) having its end $8^g$ bent at an angle and vertically slotted, said strap being bolted to one or more of the joists 8, as at $8^h$, and to the tailings boards $8^c$, $8^d$ by the bolt $8^m$ which has a square shank engaging the slot in the end portion $8^g$ of the strap to prevent rotation.

As a completion of the deck-frame sections, the boards 11 and 12 are secured to the respective joists 7 and 8, (see Figs. 3 and 4), and the narrow strips $11^a$ and $12^a$ are applied to the joists at intervals of about one-eighth of an inch apart on lines parallel to the strips or boards 11 and 12, thus forming the sub-deck or first covering of the deck frame. If desired the strips 11 and 12 may be connected at their junction by countersunk hinges, but such hinged connection is not essential, as the flexibility of the working surface, whether the same be rubber, linoleum, or wood, will suffice for all requisite relative adjustments of the table planes or sections.

Upon the sub-deck or first covering above specified, the final covering or working surface of the table is applied; such covering or working surface may be of linoleum or rubber and may have riffles applied thereto, or, the same may be formed of rubber having molded channels or riffles therein. The sheet or covering may be secured to the sub-deck along the line of junction of the strips 11, 12 in any suitable manner and said covering may be secured at the sides and edges of the deck by the retaining boards. Preferably, however, the working face of the table is formed of red wood boards about one half inch thick in which the channels have been planed, as indicated in Figs. 1 and 23 of the drawings. In such case the hinges connecting the relatively movable sections and the linoleum covering may be omitted, as the red wood will possess the required toughness and flexibility to permit of the proper relative adjustment of the planes.

In some instances the depth of the grooves of the working surface of the table may be increased by building up the lands between the channels, for example along and across the zone of flexure of the table as indicated at $12^b$ Figs. 1, 23, and 24, and in some cases plane surfaces in conjunction with a series of short riffles, such as $12^b$, which occupy the zone of flexure and thus form limited channels increasing the capacity of the table by arresting the side drift of the accumulation of metallics along the line of flexure, will be found a valuable modification, especially when very finely comminuted material is being operated upon.

W indicates the dressing water supply which occupies the usual position at the feed side of the table parallel with the longitudinal axis and the line of reciprocation of the table so that the flow of dressing water is transverse and at right angles to the line of reciprocation of the table.

It will be noted on reference to Figs. 3, 4 and 23 of the drawings that the concentrates discharge end or front end of the deck on the higher or feed side projects forwardly as at $a^1$ and that the concentrate discharge or front end of the table is oblique to the line of discharge or flow of the dressing water downwardly across the table, the upper angle formed between the feed side and concentrates discharge end of the table being acute and the lower angle or angle between the tailings side and concentrates discharge end being obtuse. As a result of this construction there will be at all times a sufficient quantity of dressing water flowing over the concentrates discharge end of the table to carry or wash the concentrates over the end of the table, thus preventing banking of the concentrates at this point and enabling the drip pipe, commonly employed for such purpose, to be dispensed with.

In the form of deck shown in the principal figures of the drawings the division of the table has been made diagonally downward from the rear end and feed side of the table so as to produce two triangular planes A and B of constant area, the former of which is or may be fixed, and, for the purposes of this specification, is termed the dressing zone, and the latter of which is independently movable and is termed the stratifying zone, but it will be at once evident to a person skilled in the art, that, following the principles of construction hereinbefore laid down, the deck may, without further invention, be divided into any such number of relatively adjustable planes, constituting dressing and stratifying zones, as is consistent with the dimensions of the table, as indicated by diagrams Figs. 21 and 22.

In order to provide for the relative adjustment of the planes of the table, such zones, planes or sections as are independently adjustable, as for instance zone B, are provided at any suitable point, as for instance at the rear end adjacent to the tailings side, with an arm or bracket 13 which projects outwardly over the rear end-piece 7$^c$ of the fixed deck frame. The arm or bracket 13 is perforated near its outer end for the free passage and rotation of an adjusting screw 14, the latter being provided with a threaded nut 15 which supports said bracket and which is prevented from rotating by means of a lip 13$^a$ on the outer end of said bracket, or in other suitable manner. The lower end of adjusting screw 14 is stepped in a socket plate 16 on the rear end-piece 7$^c$ of the deck-frame, so that, when the adjusting screw 14 is rotated, the nut 15 being held against rotation, the movable deck-section will be raised or lowered at one end according to the direction in which the adjusting screw is rotated. In order to render said section or zone B rigid after adjustment and to prevent any tremor or vibration thereof other than the proper reciprocation of the table, we bolt or otherwise attach to the inner side of end-piece 7$^c$ of the deck frame a plate 17 having at its upper end an elongated slot 17$^a$ through which passes a threaded bolt 18 that is secured to the adjustable section or plane B of the table. To the threaded bolt 18 is applied a clamp nut 18$^a$, which may be loosened when the independently movable section of the deck is to be adjusted and which after adjustment, may be set home to clamp and hold said section rigidly in relation to the deck frame proper. If desired the connection between the stringers 6, 6 and the end piece 7$^c$ of the deck-frames may be strengthened at this point by means of angle plates 6$^a$ and through bolts 6$^b$, 6$^c$.

Attached to the main table on the tailings side and adjacent to the front or concentrate end thereof is the auxiliary table which is adapted to receive and concentrate the middlings from the main table, said auxiliary table in the present instance being shown as of similar construction to the main table in so far as its deck is comprised of two relatively adjustable planes $a$, $b$, the junction line of which extends obliquely downward from the feed side to the angle formed by the meeting of the front or concentrate end and tailings side of the table. The respective planes $a$ and $b$ of the auxiliary deck are of constant area, and may, if desired, be laid upon miniature deck frames of the character and construction hereinbefore pointed out for the main table. They may be provided with similar means for independently adjusting and maintaining the zone $b$ in its inclined position, but, inasmuch as the auxiliary table is of limited dimensions, in lieu of such a construction the following may be adopted. Attached to the deck frame of the main table on the tailings side thereof and adjacent to the middlings discharge, is a board 19 (see Fig. 20) of sufficient thickness to constitute a middlings channel 19$^a$ and a waste, or tailings, channel 19$^b$ above the former, the channel 19$^a$ discharging as at 19$^d$ (see Fig. 17) upon the upper or feed end of the auxiliary table and the latter, 19$^b$, discharging back of and beyond the rear or feed end of the auxiliary table. Preferably these channels 19$^a$ and 19$^b$ are made by cutting the board obliquely downward, as shown in Fig. 20, thus providing an incline from the front or concentrate end of the table toward the rear or feed end of the table, such cut terminating in a shoulder 19$^c$ and the channels being closed laterally by a second or outer board 20 and being separated by a sliding partition 20$^a$ which is movable in grooves in the board 20. By this means the sliding partition 20$^a$ can be longitudinally adjusted to increase or diminish the extent of the middlings inlet from the main table to accord with the width of the middlings zone thereon.

21—21$^a$ (see Fig. 16) indicates the stringers, or frame strips, for the deck of the auxiliary table, said stringers being connected by the cross pieces 22—22. The inner frame piece or stringer, 21, may be bolted or otherwise secured to the boards 19 and 20 and, through them, to the deck-frame of the main table. Upon the cross pieces 22 is laid the sub-deck or first covering 23, each section of which may be a single board of suitable dimensions, the same joining or meeting each other on a line extending diagonally from the feed side of the table obliquely downward and forward. These sections constitute the dressing zone $a$ and the stratifying zone $b$; the section constituting the first named zone, $a$, being secured directly to the stringers 21 and cross pieces 22, while the other section, or zone, $b$, is free therefrom, is independently adjustable, and may be connected to the fixed zone $a$ by hinges 24, or in other suitable flexible manner. The working surface or cover 25 of the deck may be of linoleum or other suitable material tacked to the table along the line of junction of the zones $a$, $b$ and secured at its edges in the usual or any approved manner. The linoleum or equivalent working surface is turned down over the front end of the auxiliary table to form discharge lip $25^a$ and is raised at the rear or feed end of the table as at $25^b$ to prevent overflow at the rear end of the auxiliary table. Along the tailings side of the auxiliary deck, a strip of linoleum $25^c$ is secured to the board carrying the zone $b$ of the deck so as to overhang the inner upper edge of the tailings launder 26, the latter being secured to the outer strip or stringer $21^a$.

In order to adjust the pitch or inclination of the independently adjustable zone $b$, a flat iron strip 27 is secured to the lower rear corner thereof, said strip having a perforated projecting end through which passes a headed and threaded bolt $27^a$, such bolt passing through a coiled expansion spring $27^b$ and through the perforated projecting end of a second flat iron strip 28 secured to the outer stringer $21^a$, and being provided with a thumb nut $28^a$ by which the expansion spring may be compressed or released to effect the required adjustment of the said zone $b$. The rotation of the headed bolt $27^a$ may be prevented by engagement with a lip at the extremity of the perforated metal strip 27, or in any other suitable manner.

In order to supply the auxiliary table or deck with dressing water, there may be provided at the forward end of the dressing water box W of the main deck an angle valve 29 for regulating the supply of water to the auxiliary deck, said angle valve being arranged to discharge into the bowl $30^a$ of a pipe 30 that is supported on suitable brackets attached to the frame of the main table and is arranged, by means of an elbow or otherwise, to deliver into the dressing water box 31 of said auxiliary deck, whence the water escapes through perforations in the bottom of box 31 and is distributed in minor streams along the upper side of the auxiliary deck.

The construction of the concentrator table and its adjuncts being substantially of the character hereinbefore pointed out, the longitudinal vibration and primary lateral adjustment of the main frame of the table, as well as the method of feeding the pulp and supplying the dressing water to the table, may be such as heretofore practised, or any approved variation thereof that the particular material under treatment may require; but in any instance, those portions of the deck hereinbefore denominated the stratifying zone and the dressing zone will be relatively arranged so as to retard the transverse flow of the pulp across the table as induced by the pitch of the dressing zone, and where the stratifying zone is itself independently adjustable longitudinally, as hereinbefore pointed out, the degree of retardation of the side flow of the pulp toward the tailings discharge and also the rapidity of the travel of the metallics toward the concentrates discharge end of the table may be progressively increased, according to the requirements of the material operated upon, by a proper manipulation of the adjusting screw 14 or the thumb nut $28^a$, or both, as the case may be. The effect of the independent adjustment of the stratifying zone or zones with relation to the dressing zone or zones is that the transverse flow of the material operated upon will be retarded, thus tending to hold the metallic constituents above and forward of the oblique junction line of the zones and away from the tailings side of the deck, and at the same time accelerating the longitudinal movement of the metallic constituents and facilitating the proper stratification thereof.

Having thus described our invention, what we claim and desire to secure by Letters Patent is:

1. A concentrator deck having two planes which meet on a diagonal line extending from the upper rearward corner at the feed end of the table to the forward tail-side corner at the concentrate discharge end of the table, and provided with riffles or raised lands which form intermediate channels, the riffles or raised lands being highest intermediate of their ends and coincident with the said diagonal line, and the channels being deepest intermediate of their ends.

2. A concentrator deck comprised of a plurality of inclined planes which meet in a line extending obliquely from the rear end and feed side of the deck toward the tailings side and concentrate discharge end thereof, that plane which is located at the rear end and tailings side of the deck being of less transverse inclination than the other and being inclined downwardly from the rear toward the front end of the table, and riffles intersecting the line of junction of said planes.

3. The combination of a concentrator table or deck comprised of a plurality of transversely inclined relatively adjustable planes of constant area, which meet in a line extending from the rear end of the table toward the front end thereof in a general diagonal direction, means for simultaneously adjusting the transverse inclination of the said planes, and means for independently adjusting the transverse inclination of the plane adjacent to the tailings side of the table to retard in appropriate degree the transverse flow of pulp.

4. The combination with a concentrator table or deck comprised of a plurality of transversely inclined adjustable planes, each plane having a constant area and said planes being divided from each other on lines extending downwardly and forwardly obliquely of the table or deck from the feed side thereof to the tailings side thereof, of means for independently adjusting the transverse inclination of the plane at the tailings discharge side of said deck to retard in appropriate degree the transverse flow of pulp, and means for simultaneously adjusting the transverse inclination of the several planes.

5. The combination with a concentrator table or deck comprised of transversely inclined adjustable planes, each of said planes having a constant area and said planes being divided from each other on lines extending downward obliquely of the table or deck, of means for simultaneously adjusting the transverse inclinations of said planes, means for independently adjusting the transverse inclination of the plane adjacent to the tailings side of the table to retard in appropriate degree the transverse flow of pulp, and means for securing the respective planes in their adjusted positions.

6. The combination with a concentrator table or deck comprised of a plurality of relatively adjustable sections of constant area, said sections meeting in a line extending from the rear end of the deck downwardly toward the front end thereof in a general diagonal direction, of means for reciprocating the deck, means for adjusting the lateral inclination of the deck as a whole, and means mounted on the deck for tilting a lower section of the deck with respect to the adjacent higher deck section, said lower deck section being adjustable on an axis coinciding with its intersection with the adjacent higher deck section to thereby vary both the transverse and longitudinal inclinations of the tilted section to retard the transverse flow of the pulp and simultaneously impart to the valuable particles thereof a motion toward the concentrate discharge end of the table supplementing the motion of the particles in the longitudinal direction of the table induced by the reciprocation of said table.

7. The combination with a concentrator deck comprised of a plurality of relatively tiltable sections of constant area, said sections meeting in a line extending from the rear end of the deck toward the front end thereof in a general diagonal direction, of means for reciprocating the deck, means for adjusting the lateral inclination of the deck as a whole, means for adjusting the relative lateral and longitudinal inclinations of the separate sections of the said deck to thereby retard the transverse flow of the pulp and simultaneously impart to the valuable particles thereof a motion toward the concentrate discharge end of the table supplementing the motion of the particles in the longitudinal direction of the table induced by the reciprocation of said table, and means for securing the relatively tiltable sections in fixed relation after adjustment.

8. A concentrator deck having a plurality of transversely inclined sections which are divided from each other on a line extending obliquely downward and forward toward the concentrates discharge end of the deck, the section at the tailings discharge side of the deck having both a transverse and a longitudinal inclination to retard the transverse flow of the pulp and accelerate the longitudinal movement of the valuable particles thereover, and means for tilting said last named section to vary both its transverse and longitudinal inclination with respect to the adjacent section of the deck.

9. In a concentrator, the combination of a deck frame, means for adjusting the lateral inclination of the deck frame, a deck comprising a section at the feed side thereof, said section being attached to and adjustable with the deck frame, and a section at the tailings side of the table adjustable with relation to said deck frame to retard in appropriate degree the transverse flow of the pulp, said sections meeting in a line which extends downwardly from the rear end of the deck toward the front end thereof in a general diagonal direction.

10. A concentrator deck comprised of a plurality of transversely inclined planes, which meet in a line extending downwardly from the rear end of the deck toward the front end thereof in a general diagonal direction, that one of said planes which is at the tailings side of the deck being inclined downwardly from the rear toward the front or concentrates discharge end of the table to retard the transverse flow of the pulp and accelerate the longitudinal movement of the valuable particles thereof toward the concentrate discharge end of the table.

11. A concentrator deck comprising relatively adjustable transversely inclined sections which meet in a line extending from the rear end of the deck toward the front or concentrates discharge end thereof in a general diagonal direction, that one of said sections which is at the tailings side of the deck being inclined downwardly from the rear toward the front end of the table to retard in appropriate degree the transverse flow of the pulp and accelerate the longitudinal movement of the valuable particles thereof toward the concentrate discharge end of the table.

12. A concentrator deck comprising a plurality of transversely inclined sections which meet in a line extending downwardly from the rear end of the deck toward the front or concentrates end thereof in a general diagonal direction and which are movable with respect to each other to vary their relative transverse and longitudinal inclinations, the section at the tailings side of the deck being independently tiltable and being inclined downwardly from the rear toward the front end of the table to retard the transverse flow of the pulp and accelerate the longitudinal movement of the valuable particles thereof toward the concentrate end of the table, and riffles intersecting the line of junction of said planes.

13. A concentrator deck comprising a plurality of relatively tiltable transversely inclined sections which meet in a line extending from the rear end of the deck toward the front or concentrates discharge end thereof in a general diagonal direction, the section at the tailings side of the table being inclined downwardly toward the junction line of said sections to retard the transverse flow of the pulp, and riffles of substantially equal lengths intersecting and crossing the line of junction of said planes.

14. A concentrator deck comprising a plurality of transversely inclined relatively adjustable sections which meet in a line extending downwardly from the rear end of the deck toward the front or concentrates discharge end thereof in a general diagonal direction, one of said sections having an inclination downward from the rear toward the front end of the deck and being adapted to be tilted independently of the adjacent section to thereby vary the relative transverse and longitudinal inclinations of said sections to retard the transverse flow of the pulp and accelerate the longitudinal movement of the valuable particles of the pulp toward the concentrate discharge end of the table, and riffles intersecting the line of junction of said sections.

15. A concentrator deck comprising a plurality of transversely inclined sections of constant area each, said sections meeting in a line extending from the rear end of the deck toward the front or concentrates discharge end thereof in a general diagonal direction and being tiltable with respect to each other to thereby vary their relative transverse inclination to retard in appropriate degree the transverse flow of the pulp, and longitudinally extending riffles intersecting the line of junction of said sections.

16. A laterally tiltable concentrator deck comprised of a plurality of independent planes which meet in a line extending from the rear toward the front or concentrates discharge end of the deck in a general diagonal direction, that plane of the deck which is adjacent to the rear end and tailings side being independently tiltable to vary its inclination or pitch both transversely and longitudinally to retard the transverse flow of the pulp and accelerate the longitudinal movement of the valuable particles thereof toward the concentrate end of the table.

17. A concentrator deck having a tiltingly adjustable plane portion at the tailings side which is inclined transversely downward from the feed toward the tailings side of said deck and inclined longitudinally downward from the rear toward the front end of the table to impart to the valuable particles of the pulp a motion toward the concentrate discharge end of the table supplementing the motion of the particles in the longitudinal direction of the table induced by the reciprocation of the table, and having a plane portion at the feed side which is inclined transversely and forms an angle with the said first named portion of the deck and means for reciprocating the deck longitudinally.

18. The combination with a concentrator deck which is tiltable about a rectilinear axis to vary its transverse inclination and which is formed with a concentrates discharge end making an oblique angle with said axis, the angle formed between said axis and the deck end above said axis being obtuse and the angle formed between said axis and the deck end below said axis being acute, of means for supplying dressing water to the higher side of said deck, means for feeding pulp to said deck and means for reciprocating said table.

19. In a concentrator table, the combination with a laterally tiltable deck frame and means for tilting said frame laterally, of a deck section on the feed side of the table which is movable with said frame, and a deck section on the tailings side of the table which is tiltable with respect to said frame about a downwardly and forwardly extending axis, to thereby vary the relative transverse and longitudinal inclinations of said deck sections to retard in appropriate degree the transverse flow of the pulp and accelerate the longitudinal movement of the valuable particles thereof toward the concentrate discharge end of the table.

In testimony whereof we affix our signatures, in presence of two subscribing witnesses.

WILLIAM L. CARD.
FRANK S. CARD.

Witnesses:
 EDWIN A. SPERRY,
 PHILO. P. BUSH.

Copies of this patent may be obtained for five cents each, by addressing the "Commissioner of Patents, Washington, D. C."